Oct. 11, 1949.  S. C. HOARE  2,484,567

DIRECT CURRENT MEASURING INSTRUMENT

Filed March 2, 1948

Inventor:
Stephen C. Hoare,
by *Piarcell S. Mack*
His Attorney.

Patented Oct. 11, 1949

2,484,567

UNITED STATES PATENT OFFICE 2,484,567

DIRECT-CURRENT MEASURING INSTRUMENT

Stephen C. Hoare, Manchester, Mass., assignor to General Electric Company, a corporation of New York Application March 2, 1948, Serial No. 12,585

5 Claims. (Cl. 171—95)

My invention relates to direct-current measuring instruments of the type using a stationary permanent magnet field, a stationary energizing coil and a polarized magnet armature influenced jointly by the cross fields produced by the stationary permanent magnet and energizing coil, and its object is to provide a small, low-cost, rugged instrument of good accuracy suitable for use as a battery current indicator on battery chargers, automobiles, etc., or as a voltmeter. An important aspect of my invention is provision for changing the position of the stationary permanent magnet to adapt the instrument for use either as a zero-center reverse current instrument or as a unidirectional current measuring instrument, with the zero at one end of the scale. This stationary permanent magnet is held in either angular position in suitable recesses in a molded case of insulation material by its own resiliency and fit. The molded case of insulating material is used as the energizing winding coil form and the coil is wound on the outside thereof. This case is made of a material which is sufficiently hard as to serve as an instrument bearing material, and one of the stationary bearings is molded directly therein. The other stationary bearing is provided in the scale plate. Thus the instrument comprises only a few easily assembled parts.

Figure 2:
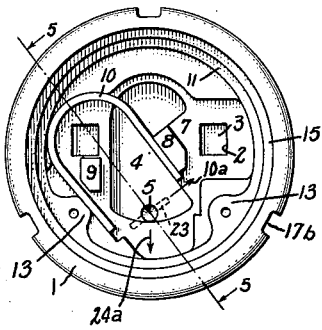
Figure 5:
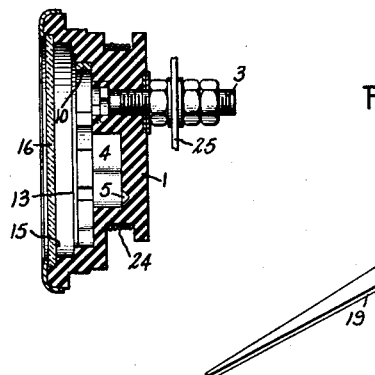
Figure 7:
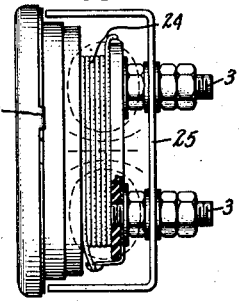
Figure 3:
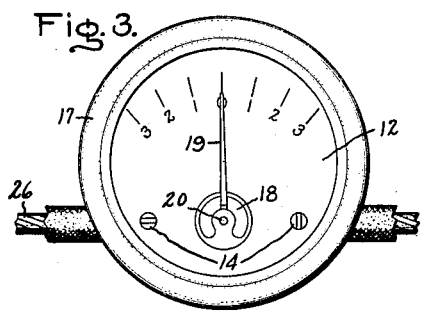
Figure 4:
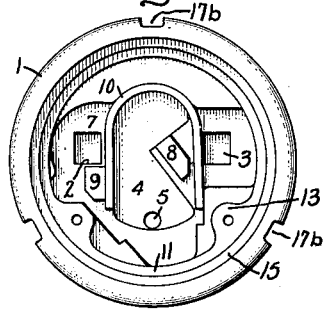

The features of my invention which are believed to be novel and patentable will be pointed out in the claims appended hereto. For a better understanding of my invention reference is made in the following description to the accompanying drawing which shows, in Fig. 1, a front view of a measuring instrument having a scale with the zero at one end thereof; and Fig. 2 is a front view of the interior of the casing with the dial and armature removed to show the position of the stationary permanent magnet for the scale arrangement of Fig. 1. Figs. 3 and 4 are front and interior views corresponding to Figs. 1 and 2, respectively, but with the scale markings and magnet positioned for a zero-center scale arrangement. Fig. 5 is a cross-sectional view taken on line 3—3 of Fig. 2. Fig. 6 is an exterior side view of the instrument showing the disposition of the energizing winding. Fig. 7 is a perspective view of the moving armature element. Fig. 3 also shows a single busbar energizing arrangement for heavy current.

The body of the casing 1 of my instrument is preferably made of a good grade of molded insulating compound. This molding is round with a closed back, except for openings at 2 for the insertion of a pair of studs 3 used as terminal and mounting studs. The front of the molding is open and the interior is molded to a shape suitable for securing the instrument parts to be inserted therein. Thus the casing has a deep recess or cavity part 4, the lower portion of which accommodates the armature assembly shown in Fig. 7 and has a cone-shaped bearing depression 5 molded directly into the compound to accommodate the lower pivot 6 of the armature. Surrounding the deep cavity part is a cavity portion 7 of less depth, shaped and provided with block-shaped projections 8 and 9 to fit and hold the horseshoe-shaped stationary permanent magnet 10 in either of the two positions shown in Figs. 2 and 4. This magnet is made so that when inserted, its prongs have to be sprung toward each other slightly so as to fit into the space provided therefor. Thus, in Fig. 2, one prong of the magnet presses outwardly against block 8, while the yoke and other prong are pressed outwardly against portions of the left side of cavity part 7 which are shaped to fit the contour of the magnet. This is the position of magnet 10 when assembled for the type of scale shown in Fig. 1. In Fig. 4 the same magnet is so positioned for zero-center scale instrument operation and here the left prong of the magnet presses outwardly against block 9, and the yoke and right prong of the magnet are pressed outwardly against the upper end and right side portions of the cavity part 7. The magnet holding surfaces of the recess or cavity 7 do not need to embrace every portion of the outer periphery of the magnet, as it will be noted that the cavity part 7 extends somewhat beyond the magnet positions adjacent the intermediate portions of such magnet. The magnet is sprung into position and held primarily at the yoke and pole piece ends thereof by the resiliency of the magnet, and requires no other holding or positioning means securely to hold it in the two positions illustrated. It is evident that the permanent magnet may be assembled in two positions with the armature lying between its pole pieces, so that the field flux may cut the armature in two different directions at an angle to each other and both at right angles to the axis of rotation of the armature. The utility of this feature is not confined to the particular type of instrument herein described.

The casing molding also has an outwardly facing surface 11 completely surrounding the cavity parts previously mentioned, against which the periphery of the circular scale plate 12 rests. This surface includes the upper sides of molded in bosses at 13 having screw-threaded openings for securing the scale plate in place by screws 14. A second circular outwardly facing surface 15 of greater diameter than the scale plate is provided as a seat for the transparent front window 16, the outer surface of which is flush with the front outer surface of the molded casing 1. The removable transparent front window is secured in place by a metal rim part 17 which has a three-prong bayonet type fastening with the casing as indicated.

Figure 1:
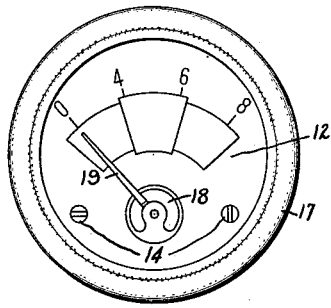

The scale plate 12 may have a double scale, one graduated like that shown in Fig. 1 and the other graduated like that shown in Fig. 3; or two sets of scale plates with the two types of scales may be provided. In either case the scale of Fig. 1 will be used for the position of magnet shown in Fig. 2, and a zero-center scale like that shown in Fig. 3 will be used when the magnet 10 is assembled as in Fig. 4. Thus, instead of manufacturing two kinds of instruments, both kinds are available with the same instrument parts, with the possible exception of the scale plate. Likewise, a purchaser may purchase one instrument with an extra interchangeable scale plate and have two kinds of instruments for practically the cost of one. The scale plate or plates used have a cutout sector at 18 to permit the pointer 19 of the armature assembly to extend through from the armature to the front of the scale, and a cone-shaped depression at 20 is provided in the underside of the scale plate in line with the axis of rotation of the armature shaft 21 to accommodate the upper pivot end 22 of such shaft.

The armature per se is a bar-shaped permanent magnet 23 secured at its center to the hub of the pointer and to the shaft, with its axis extending at approximately right angles to the pointer as represented in Fig. 7. The armature magnet 23 is assembled so as to lie approximately between and equally distant from the pole pieces of the permanent field magnet 10. Its position for a zero instrument reading and a zero left scale distribution is indicated by dotted lines in Fig. 2. The magnetic attraction between the stationary and rotatable permanent magnets furnishes the zero return torque, and no spiral springs for this purpose or for lead-in terminals are required.

To assemble the meter parts thus far described, the magnet 10 is first sprung into place. A dial plate having the correct scale is selected and the armature assembly of Fig. 7 is picked up and the pointer 19 thereof inserted through the slot 18 from the underside, and the pivot 22 seated in its upper bearing 20 in the underside of the scale plate. The scale plate and armature assembly as thus assembled are then lowered into position, seating the lower pivot 6 in its bearing at 5. This procedure may be facilitated, if necessary, by temporarily fastening the pointer 11 to the front of the scale plate by a small piece of Scotch tape, so as to retain the top pivot 22 in place and shaft 21 in proper alignment with the lower bearing as the parts are lowered into place. The tape is then removed and the scale plate is then fastened in place by the screws 14. The section of metal of the scale plate supporting the upper bearing may be bent up or down as necessary to obtain a proper bearing fit. The window 16 is then fastened in place by assembling it within the rim 17; aligning the tabs 17a of this rim with corresponding radial slots 17b in the rim of the casing 1, pushing the rim into place tight against the casing front and then giving it a slight turn to bring the tabs 17a beneath the rim of the casing.

The energizing winding for the instrument may comprise a few turns of insulated wire 24 wrapped around the back portion of the cylindrical casing with the ends fastened to the terminal studs 3 as represented in Fig. 6. A groove may be provided in the wall of the casing for this purpose. It will be evident that when current is passed through such a winding, a field is produced axially of the pancake-shaped coil with a return path about the coil sides. A portion of this field, namely, that portion which passes around the bottom rim of the coil, will pass through the area occupied by the permanent magnet bar armature 23 and in a vertical direction. The general distribution of such field is indicated by dotted lines in Fig. 6, and the portion which acts upon the armature may be represented by the arrow 24a in Fig. 2, while the field produced by the magnet 10 may be represented by the arrow 10a. It is evident that the field 10a will tend to hold the armature in the zero scale indicating position shown, while the field 24a will tend to rotate the armature clockwise from the position shown, and as a result it will seek an intermediate position which depends upon the relative strength of such fields. Since the field 10a is constant, the deflection will be proportional to field 24a or to the current flow in coil 24. If the polarity is wrong for the instrument of Figs. 1 and 2, it is corrected by reversing the connections to the coil terminals. A reverse polarity condition could also be corrected by turning the magnet 10 over, but this is unnecessary. A correct zero setting of the pointer may be had by bending the pointer slightly if necessary as soon as the field magnet, armature and scale plate are assembled.

In the case of the zero-center scale instrument of Figs. 3 and 4, the same principles apply. The two fields 10a and 24a will be at right angles to each other and at right angles to the axis of rotation. Field 10a will tend to hold the instrument deflection to the zero center, and field 24a will tend to produce a deflection from zero in a direction dependent on polarity and by an amount proportional to the current flow in coil 24.

In Fig. 6 at 25 there is shown a clamping bar secured in place on the terminal studs 3. The shape and disposition of such a bar when used will vary with different ways of mounting the instrument on a panel or other supporting structure. If the bar 25 be made of steel or other magnetic material, it should be in place when the instrument is calibrated, as it may have an influence on the field distribution.

The number of turns and size of wire in the winding 24 will depend upon the purpose and calibration of the instrument. For example, if used as a voltmeter, the winding will have many turns of fine wire as compared to a few turns of heavier wire for an ammeter. For an exceptionally heavy current ammeter the exciting winding may be reduced to a half turn, consisting of a cable secured in fixed relation in close proximity and to the rear of the instrument as represented by the cable 26, Fig. 3, so that the flux about the cable produced by current flow therethrough threads the area occupied by the armature 23 in a vertical direction, at right angles to its axis of rotation.

In order to give a practical example but not by way of limiting the invention, the instrument described may have a case diameter of two inches and other dimensions in the proportions represented in the drawing. For such an instrument the dimensions of the bar magnet armature may be 3/8 inch long and have a cross section of .068 inch x .02 inch, and be made of an alloy containing 60.% copper, 20.% nickel and 20.% iron. This polarized armature will be magnetized to saturation. The U-shaped field magnet may be made from a bar of three per cent chrome steel 2.43 inches long and .13 inch x .063 inch in cross section, and stabilized by a fifteen to twenty per cent knockdown after being fully magnetized.

Because the instrument uses a permanent magnet in the armature, the instrument has measurement accuracy characteristics corresponding to a d'Arsonval instrument in the measurement of average values of direct current, but without the disadvantages of lead-in spirals. This makes the instrument especially adapted for use on rectifier battery charging circuits because its accuracy is not influenced by variations in wave shape, and it can withstand the occasional momentary overload conditions typical of such circuits. Also, the rather extended temperature changes to which battery charger instruments are likely to be subjected have little influence on the accuracy of this instrument because it has a negligible temperature error.

What I claim as new and desire to secure by Letters Patent of the United States is:

1. A direct-current electrical measuring instrument comprising a casing, a permanent magnet in said casing for producing a constant unidirectional field, a polarized armature pivoted within and subject to the influence of the field produced by said magnet, an energizing winding for said instrument for producing a field of fixed direction influencing said armature, said casing having its interior provided with two recesses sufficiently conforming to the contour of said magnet and angularly oriented with respect to each other as to provide two separate and distinct holding positions for said permanent magnet so that the flux thereof may cut the armature axis of rotation at two different angles differing from each other by at least 30 degrees when the magnet is positioned in the two different holding positions respectively.

2. In a direct-current measuring instrument, a casing, an armature pivoted in said casing, and a horseshoe-shaped permanent magnet within said casing with its pole pieces on opposite sides of the armature so as to produce a field flux through the armature at right angles to its axis of rotation, said casing having its interior provided with two recesses sufficiently conforming to the contour of said magnet and angularly oriented with respect to each other as to provide two separate and distinct holding positions for said magnet in order that the magnet may be assembled in the casing so that its flux will cut the armature in either of two different directions at an angle to each other of at least 30 degrees both at right angles to the axis of rotation of the armature.

3. In a direct-current measuring instrument, a casing of molded insulating material, an armature pivoted in said casing, a horseshoe-shaped permanent magnet in said casing, said casing having angularly disposed recesses in an internal wall thereof sufficiently conforming in outline to the contour of said magnet as to provide two separate and distinct holding positions therefor such that the magnet may be assembled to produce a flux through the armature in two different directions at an angle to each other of not less than 30 degrees both at right angles to the axis of rotation of the armature, said magnet being sufficiently resilient and so shaped that in assembling it in its two holding positions it is required to be sprung slightly and pressed into the holding recesses in the casing, said magnet being secured in said two positions solely by its own resiliency and fit in the recessed casing.

4. A direct-current measuring instrument comprising a casing of nonmagnetic material, a polarized armature pivoted in said casing, a pointer secured to and moved by said armature, a scale plate over which said pointer is adapted to be deflected by rotation of said armature, a permanent magnet in said casing for producing a constant field through the armature and determining the zero position of the pointer on the scale plate, said casing having angularly disposed magnet holding recesses therein sufficiently conforming in outline to the contour of said magnet as to provide for the assembly of said permanent magnet therein in either of two positions at an angle from each other of at least 30 degrees, one of which causes the zero position of the pointer to lie near one end of the scale plate and the other which causes the zero position of the pointer to lie near the center of the scale plate, and a direct-current energizing winding for said instrument in fixed relation with said casing and exterior thereof for producing a variable flux field through the armature at approximately right angles to its axis of rotation and at an angle differing from that of the fields produced by the permanent magnet in either of its two positions.

5. A direct-current measuring instrument comprising a cylindrical-shaped casing of insulating material, a polarized armature pivoted in said casing, a pointer secured to and moved by said armature, a scale plate over which said pointer is adapted to be moved, a permanent magnet in said casing for producing a constant field through said armature at right angles to its axis of rotation and determining the zero position of the pointer, said casing having its interior shaped by angularly disposed recesses sufficiently conforming to the contour of said magnet as to provide two different holding positions for the permanent magnet, one position establishing the zero position of the pointer near one end of the scale plate, and the other establishing the zero position of the pointer near the center of the scale plate, and a direct-current energizing winding for said instrument comprising conductor turns wrapped around the rear exterior portion of said casing so as to produce a flux field through the armature at approximately right angles to its axis of rotation and at right angles to the field produced by the permanent magnet when the latter is positioned to establish the zero position of the pointer near the center of the scale plate.

STEPHEN C. HOARE.

REFERENCES CITED

The following references are of record in the file of this patent:

UNITED STATES PATENTS

| Number | Name | Date |
|---|---|---|
| 1,315,781 | Le Baron | Sept. 9, 1919 |
| 1,586,768 | Todd | Apr. 13, 1926 |